(12) United States Patent
Petricoin, Jr.

(10) Patent No.: US 9,684,286 B2
(45) Date of Patent: Jun. 20, 2017

(54) SECURITY SYSTEM WITH POINT BUS ABSTRACTION AND PARTITIONING

(71) Applicant: Robert Bosch GmbH, Stuttgart (DE)

(72) Inventor: Dennis M. Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 14/151,092

(22) Filed: Jan. 9, 2014

(65) Prior Publication Data

US 2015/0070130 A1    Mar. 12, 2015

Related U.S. Application Data

(60) Provisional application No. 61/876,970, filed on Sep. 12, 2013.

(51) Int. Cl.
  *G05B 11/01*    (2006.01)
  *G05B 15/02*    (2006.01)
  (Continued)

(52) U.S. Cl.
  CPC ............ *G05B 11/012* (2013.01); *G05B 15/02* (2013.01); *G08B 25/009* (2013.01); *G08B 25/14* (2013.01); *G08B 25/003* (2013.01)

(58) Field of Classification Search
  CPC ..... G08B 25/14; H05B 37/0272; H02J 13/00; H04L 29/06
  (Continued)

(56) References Cited

U.S. PATENT DOCUMENTS 5,117,219 A * 5/1992 Tice .................... H04Q 9/14
                                           340/505
5,818,334 A * 10/1998 Stanley ............... G08B 26/001
                                           340/3.53
(Continued)

FOREIGN PATENT DOCUMENTS

EP         0156474       10/1985
EP         1521401        4/2005
(Continued)

OTHER PUBLICATIONS

Extended European Search Report for Application No. 14180511.9 dated Jan. 30, 2015 (8 pages).
(Continued)

*Primary Examiner* — George Bugg
*Assistant Examiner* — Munear Akki
(74) *Attorney, Agent, or Firm* — Michael Best & Friedrich LLP (57) ABSTRACT

Security systems and methods of operating the same. One security system includes a plurality of point devices positioned in a premises, a plurality of interim devices, and a control panel. The system also includes a first communication bus connecting the control panel and each of the plurality of interim devices and a plurality of second communication buses. Each of the plurality of second communication buses connects one of the plurality of interim devices with at least one of the plurality of point devices. The control panel is also configured to address a message for one of the plurality of point device based on an identifier of the one of the plurality of point devices and an identifier of at least one of the plurality of interim devices connected to the point device over one of the plurality of second communication buses.

15 Claims, 4 Drawing Sheets

(51) Int. Cl.
*G08B 25/14* (2006.01)
*G08B 25/00* (2006.01)

(58) Field of Classification Search
USPC ............ 340/506, 3.5, 3.52, 3.53, 3.54, 4.21
See application file for complete search history.

(56) References Cited

U.S. PATENT DOCUMENTS

| | | | |
|---|---|---|---|
| 6,233,588 B1 | 5/2001 | Marchoili et al. | |
| 6,374,373 B1* | 4/2002 | Heim | H04L 12/2697 |
| | | | 714/43 |
| 7,545,264 B2* | 6/2009 | Brecher | G08B 26/003 |
| | | | 340/506 |
| 7,852,209 B2* | 12/2010 | Shrode | A62B 99/00 |
| | | | 340/332 |
| 8,424,078 B2 | 4/2013 | Accapadi et al. | |
| 8,612,056 B2* | 12/2013 | Klasson | H04L 12/2807 |
| | | | 160/120 |
| 8,922,379 B1* | 12/2014 | Meyer | G08B 21/20 |
| | | | 340/521 |
| 2003/0234725 A1* | 12/2003 | Lemelson | G08B 7/066 |
| | | | 340/521 |
| 2004/0167672 A1 | 8/2004 | McIlhany et al. | |
| 2004/0233855 A1* | 11/2004 | Gutierrez | H04L 45/00 |
| | | | 370/252 |
| 2005/0033458 A1 | 2/2005 | Brindac et al. | |
| 2007/0096901 A1* | 5/2007 | Seeley | G08B 25/009 |
| | | | 340/539.18 |
| 2008/0019072 A1* | 1/2008 | Donnell | H01R 9/2408 |
| | | | 361/119 |
| 2008/0070547 A1 | 3/2008 | Schreyer | |
| 2009/0037941 A1 | 2/2009 | Armstrong et al. | |
| 2014/0316736 A1* | 10/2014 | Strohbach | H04L 67/12 |
| | | | 702/127 |

FOREIGN PATENT DOCUMENTS

| | | |
|---|---|---|
| WO | 98/51118 | 11/1998 |
| WO | 03/079192 | 9/2003 |
| WO | 2010/025237 | 3/2010 |

OTHER PUBLICATIONS

European Examination Report for Application No. 14180511.9 dated Feb. 8, 2017 (5 pages).

* cited by examiner

SECURITY SYSTEM WITH POINT BUS ABSTRACTION AND PARTITIONING

RELATED APPLICATIONS

This application claims priority to U.S. Provisional Patent Application No. 61/876,970, filed Sep. 12, 2013, the entire content of which is hereby incorporated by reference.

BACKGROUND

Embodiments of the present invention relate to methods and systems for point bus/device bus hardware-level abstraction with inherent logical partition (area) addressing and pre-configuration methods.

SUMMARY

Traditional methods use logical interconnection within system programming where devices, while often physically co-located, need to be grouped. Accordingly, embodiments of the invention provide usage intermediate devices that can be used to, via wiring methods, addressing schemes, and installation practices, generate logical partitions for intrusion security systems. Therefore, embodiments of the invention provide easier setup and more flexibility.

In particular, one embodiment of the invention provides a security system including a plurality of point devices positioned in a premises, a plurality of interim devices, and a control panel. The security system also includes a first communication bus connecting the control panel and each of the plurality of interim devices and a plurality of second communication buses. Each of the plurality of second communication buses connecting one of the plurality of interim devices with at least one of the plurality of point devices. The control panel is also configured to address a message for one of the plurality of point device based on an identifier of the one of the plurality of point devices and an identifier of at least one of the plurality of interim devices connected to the point device over one of the plurality of second communication buses.

Another embodiment of the invention provides a method of communicating with a point device connected to a control panel included in a security system. The method includes addressing, at the control panel, a message to the point device based on an identifier of the point device and an identifier of an interim device connected to the point device and transmitting, at the control panel, the message to the interim device over a first communication bus. The method also includes transmitting the message from the interim device to the point device over a second communication bus, wherein the control panel is not directly connected to the second communication bus.

Other aspects of the invention will become apparent by consideration of the detailed description and accompany drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, the methods, operations, and sequences described herein can be performed in various orders. Therefore, unless otherwise indicated herein, no required order is to be implied from the order in which elements, steps, or limitations are presented in the detailed description or claims of the present application. Also unless otherwise indicated herein, the method and process steps described herein can be combined into fewer steps or separated into additional steps.

In addition, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "controllers" and "control units" described in the specification can include standard processing components, such as one or more processors, one or more non-transitory computer-readable medium modules, one or more input/output interfaces, and various connections (e.g., a system bus) connecting the components.

Figure 1A:
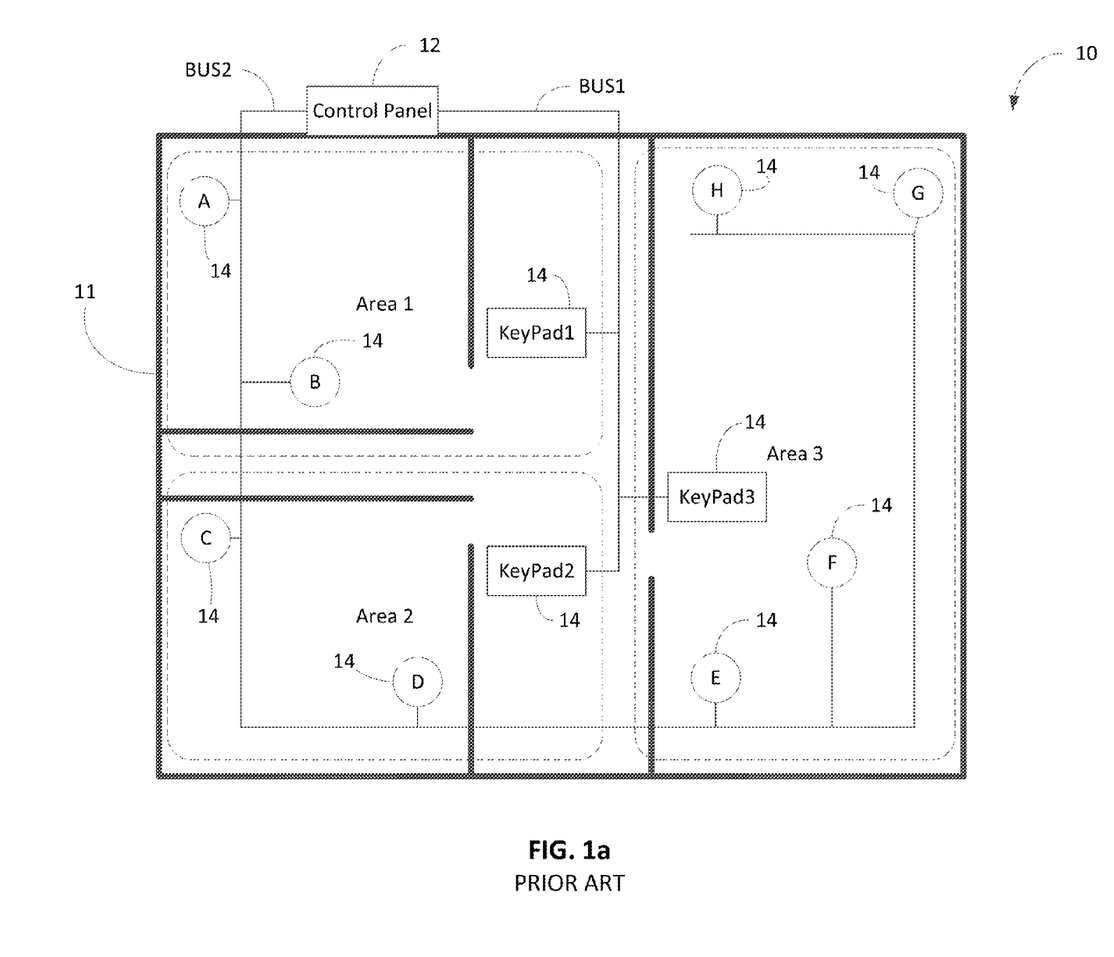
FIG. 1a schematically illustrates a traditional security system.

FIG. 1a schematically illustrates a security system 10 for a building or premises (e.g., a part of a building and/or area of land) 11. The system 10 includes a control panel 12. The control panel communicates with a plurality of security devices 14. The security devices 14 can include one or more input devices that receive input from the environment of the premises 11. For example, an input device can include a motion detector, a panic button, a smoke detector, a water sensor, a flow switch, an image sensor (e.g., a camera), etc. The security devices 14 can also include one or more output devices that provide output to the environment of the premises 11. For example, an output device can include a relay, a siren, a door strike, strobes, etc. Input and output devices are collectively referred to in the present application as "point devices" or "points."

The security devices 14 can also include one or more interface devices that interfaces with an individual located in the premises. For example, an interface device can include an access reader, a keypad, a keyswitch, etc.

The security devices 14 are grouped based on their position within the premises (e.g., point devices associated with a particular room of the premises are associated with at least one interface device also located in or outside the same room). For example, a door strike for a particular door may be associated with a keypad or reader associated with the door and may also be associated with other point devices located within the room adjacent to the door.

Figure 1B:
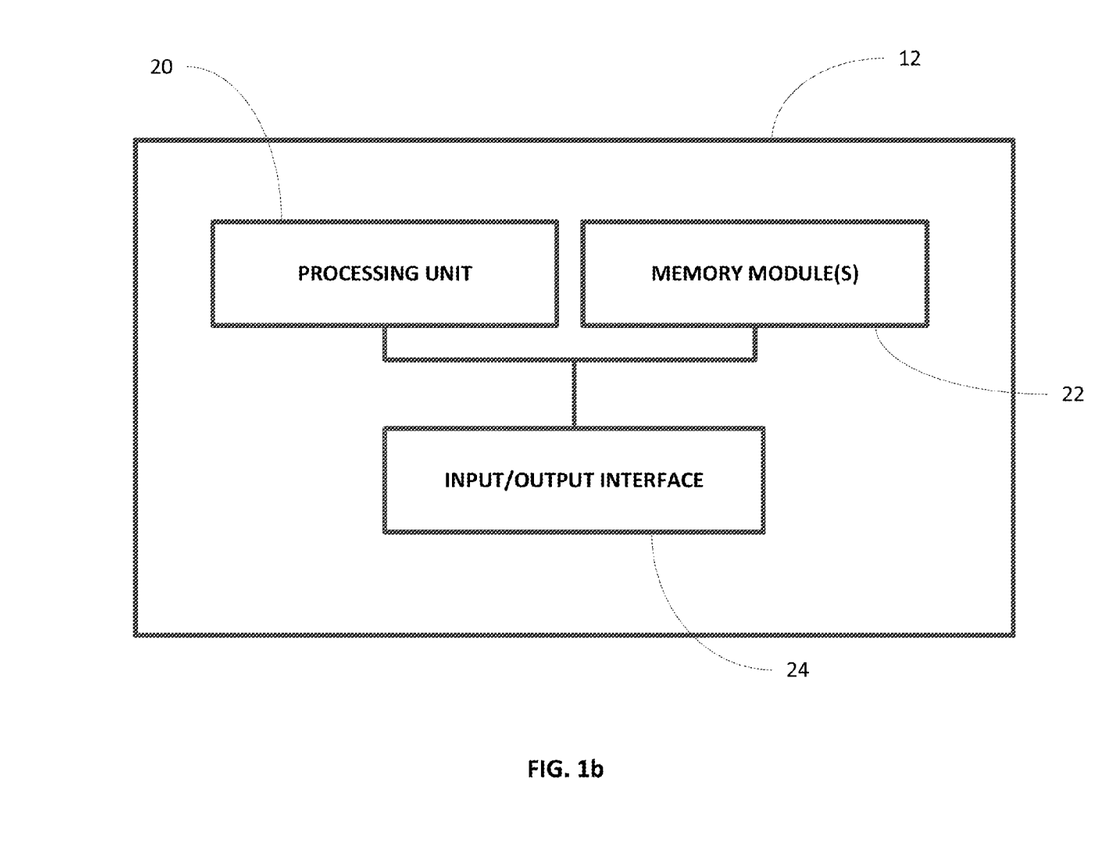
FIG. 1b schematically illustrates a control panel for a security system.

As illustrated in FIG. 1b, the control panel 12 can be configured in a number of different ways and can include a processing unit 20 (e.g., a microprocessor, an application specific integrated circuit ("ASIC"), etc.), one or more memory modules 22, and an input/output interface 24. The memory module 24 includes non-transitory computer-readable medium, such as random-access memory ("RAM") and/or read-only memory ("ROM"). The processing unit 20 retrieves instructions from the memory module 24 and executes the instructions to perform particular functionality as described in more detail below. The processing unit 20 can also retrieve and store data to the memory module 24 as part of executing the instructions. The processing unit 20 also obtains data from external devices and systems through the input/output interface 24. For example, the input/output interface 24 can connect the control panel 12 with the security devices 14 over one or more wired communication buses.

The functionality performed by the control panel 12 includes monitoring and controlling operation of the security devices 14 to provide security for the premises 11. For example, if a smoke detector detects smoke, the control panel 12 receives a signal from the smoke detector and takes various actions, such as activating an alarm (e.g., an audible or visual alarm), closing or locking one or more doors, and activating a sprinkler system. In some embodiments, the control panel also communicates with a central station or system to log the activity and request support if needed. If a user wants to modify or stop any of the actions initiated by the control panel 12, the user can communicate with the control panel 12 through an interface device (e.g., by entering a "cancel" code through a keypad).

The interface between the control panel 12 and the security devices 14 is typically proprietary and run over a few wires (e.g., 2 to 4 wires). Although wireless systems exist (using a wireless local area network or wide area network), the messaging protocol used by the system is proprietary. Accordingly, programming the security system 10 is inherently complicated and becomes more so depending on the size of the system (e.g., the area covered by the system and the number of devices included in the system).

For example, a typical installation of the security system 10 includes point devices connected by a wiring system (e.g., bus) that is not tied to the same wiring system (e.g., bus) connecting the interface devices. In particular, as illustrated in FIG. 1a, the control panel 12 is connected to the three keypad devices over a device bus ("BUS1") and is connected to the eight I/O devices over a separate point bus ("BUS2").

Accordingly, as the system 10 grows, there are programming challenges with making logical connections between the control panel and every I/O point and, optionally, between I/O points. For example, illustrated in FIG. 1a, typical wiring for the system 10 requires long runs and logical connections between the control panel 12 and each point device and long runs and logical connections between the control panel 12 and each interface device. Furthermore, the disconnection between the two wiring systems makes communication between the point devices and the interface devices difficult if not impossible. Furthermore, the discrete wiring systems make communication between the control panel 12 and the security devices 14 complex. In particular, the control panel 12 must communicate over both wiring systems, which may use different messaging protocols.

In addition to the wiring challenges, a system 10 wired as illustrated in FIG. 1a poses programming complexities. For example, to manage all security devices 14, areas or partitions are defined for the premises 11 (e.g., areas 1, 2, and 3). In some embodiments, the areas correspond to separate rooms of the premises 11. The system 10 is then configured by assigning each interface device to a particular area as illustrated in Table 1 below:

TABLE 1

| Interface Device | Area |
|---|---|
| Keypad1 | 1 |
| Keypad2 | 2 |
| Keypad3 | 3 |

Similarly, each point device is assigned to a particular area as illustrated in Tables 2-4 below:

TABLE 2

| I/O Device | Area |
|---|---|
| DeviceA | 1 |
| DeviceB | 1 |

TABLE 3

| I/O Device | Area |
|---|---|
| DeviceC | 2 |
| DeviceD | 2 |

TABLE 4

| I/O Device | Area |
|---|---|
| DeviceE | 3 |
| DeviceF | 3 |
| DeviceG | 3 |
| DeviceH | 3 |

After making these assignments, each area then needs to be configured so that the control panel 12 properly monitors and controls each area and the devices 14 associated with each area (e.g., thresholds or combinations for alarms, actions to take upon the occurrence of a particular alarm, etc.).

To simplify the programming and installation while providing improved performance and flexibility, embodiments of the present invention abstract the connections to interim devices (e.g., the interface devices) to make wiring easier and to make logical partitions inherent in the wiring.

Figure 2:
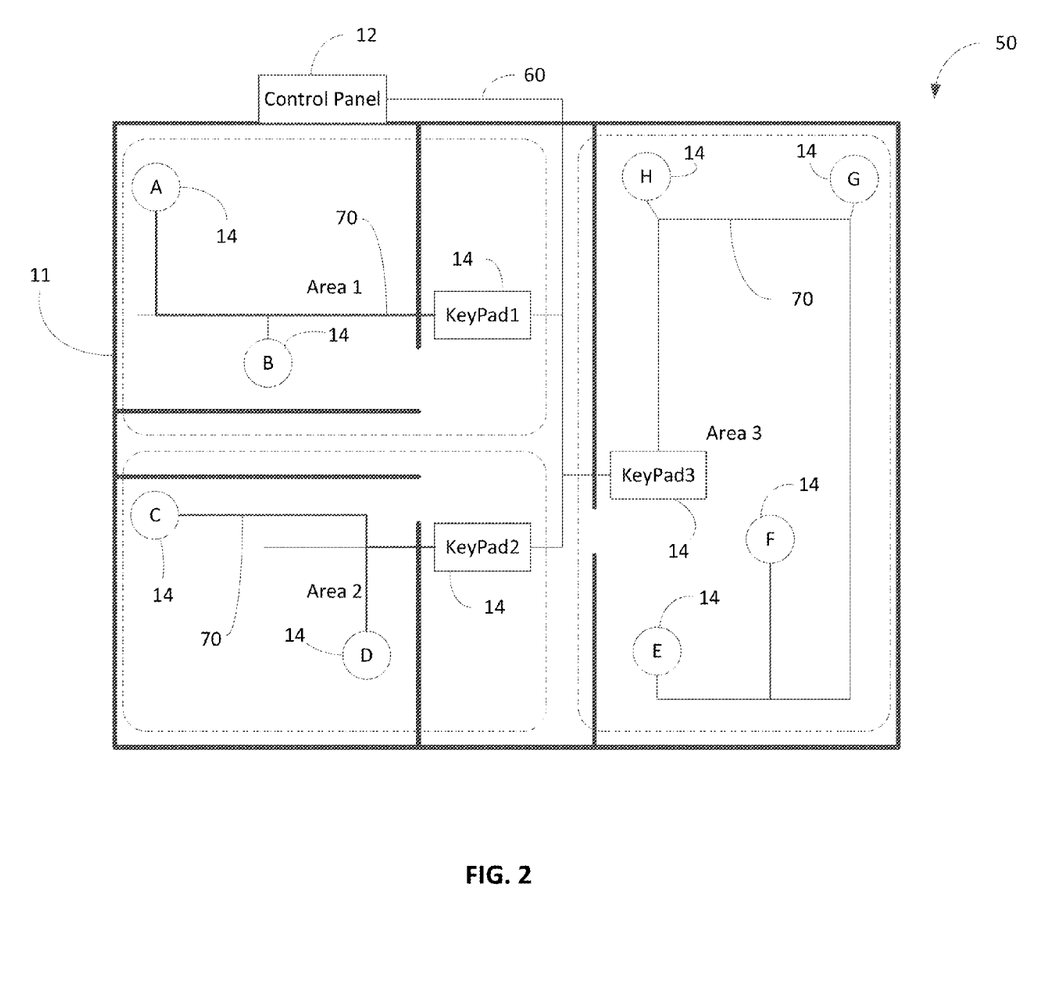
FIG. 2 schematically illustrates a point-based security system.

For example, FIG. 2 illustrates a security system 50 for the same premises 11 illustrated in FIG. 1a. Like the system 10, the security system 50 includes the control panel 12 and the security devices 14. However, as illustrated in FIG. 2, the control panel 12 is not directly connected to the point devices. Rather, the control panel 12 is connected to the interface devices (i.e., the Keypad1, Keypad2, and Keypad3) through a first or main communication bus 60, and each interface device is connected to one or more point devices through a second or secondary communication bus 70. As illustrated in FIG. 2, the control panel 12 is not directly connected to any of the secondary communication buses 70.

In some embodiments, the location of each interface device within the premises 11 defines an area of the premises 11. The particular point devices connected to each interface device can include those point devices positioned within the defined area. For example, to keep wiring at a minimum, the area can be defined to include those point devices that are closest to a particular interface device as compared to other interface devices. In other embodiments, those point devices associated with the same room of the premises 11 as a particular interface device are connected to that interface device over a second communication bus 70. As illustrated in FIG. 2, using this approach naturally defines areas (e.g., Area 1, Area 2, and Area 3) that correspond to specific rooms of the premises 11. For example, point devices downstream from a particular keypad (i.e., connected on the same secondary bus 70) can by default be assigned to same "Area" defined by the keypad for system configuration purposes as described above. These defaults, however, can be manually adjusted if needed (e.g., through the control panel 12). Therefore, the simplified wiring generates logical partitions for the premises 11, which requires less complex configuration.

As illustrated in FIG. 2, using the daisy-chained first and second communication buses 70 simplifies and reduces the amount of wiring or connections required as compared with the wiring configuration illustrated in FIG. 1a, which reduces complexity and costs. Furthermore, the daisy-chain configuration illustrated in FIG. 2 simplifies addressing and partitioning of the security devices 14. In particular, the addressing for each security device 14 is defined by the configuration of the buses. For example, each device 14 can have an address according to the following format:

MAIN BUS IDENTIFIER:DEVICE IDENTIFIER:POINT DEVICE IDENTIFIER

Table 5 illustrates example addresses for the point devices illustrated in FIG. 2 using the above address format:

TABLE 5

| I/O Device | Address |
| --- | --- |
| DeviceA | BUS1:Keypad1:DeviceA |
| DeviceB | BUS1:Keypad1:DeviceB |
| DeviceC | BUS1:Keypad2:DeviceC |
| DeviceD | BUS1:Keypad2:DeviceD |
| DeviceE | BUS1:Keypad3:DeviceE |
| DeviceF | BUS1:Keypad3:DeviceF |
| DeviceG | BUS1:Keypad3:DeviceG |
| DeviceH | BUS1:Keypad3:DeviceH |

Therefore, each point device is addressed by the communication path between the device and the control device 12. Using this addressing scheme simplifies configuration of the system 50 and makes it easier to add and delete security devices. For example, as noted above, the addressing provides inherent area definitions or partitions (e.g., any point device addressed through "Keypad3" is associated with "Area 3"). Also, the simplified wiring and inherent partitioning makes it easier to add and delete point devices. Furthermore, the control panel 12 communicates over a single bus rather than two buses as illustrated in FIG. 1a. In addition, in some embodiments, the control panel 12 is configured to transmit a single message to a keypad that provides instructions both to the keypad and the point device connected to the keypad.

It should be understood that the communication buses 60 and 70 can be wired, wireless (e.g., IP), or a combination thereof. Also multiple main buses can be used depending on the number of interface devices. Similarly, it should be understood that the devices selected as the interim device may not be the interface devices. For example, if each room includes smoke detector, the smoke detectors can be used as the interim devices where the main bus is between the control panel 12 and the smoke detectors. In some embodiments, the interim device can be any device reduces the number of connections to the control panel 12 and, optionally, define logical areas of the premises. In general, any security device 14 configured to receive and retransmit messages can be used as interim device.

Also, in some embodiments, multiple levels of buses can be used. For example, a keypad may be connected to a point device over a second communication bus 70, but the point device can be connected to one or more additional point devices in a serial configuration. For this type of configuration, the same addressing mechanism can be used as described above (e.g., "BUS2:Keypad2:Device4:Device5").

Figure 3:
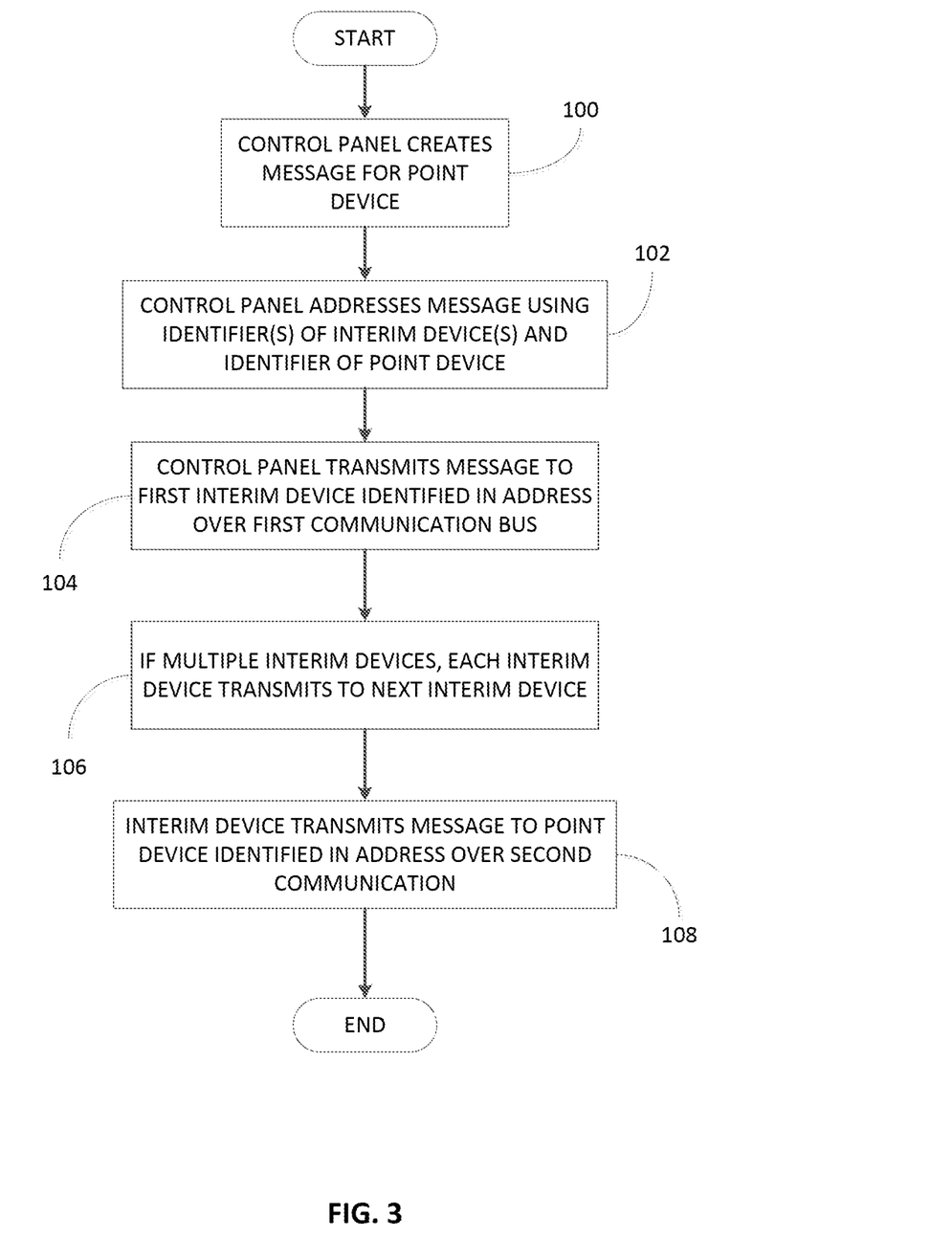
FIG. 3 is a flow chart illustrating a method of communicating between a control panel and point devices included in the security system of FIG. 2.

The control panel 12 communicates with the point devices as illustrated in FIG. 3. In particular, the control panel 12 composes a message for a particular point device (at block 100). The message may instruct the point device to activate, deactivate, etc. The control panel 12 addresses the message using the addressing scheme described above. In particular, the control panel 12 addresses the message using an identifier of any interim devices (e.g., any device positioned upstream of the point device based on the wiring configuration) and an identifier of the point device (at block 102). In some embodiments, each identifier is unique. For example, the main bus identifier uniquely identifies a single main bus 60 (e.g., if the system 50 includes multiple main buses), the device identifier uniquely identifies an interim device, and the point device identifier uniquely identifies a point device. In other embodiments, the identifier can identify multiple buses or devices. For example, if a keypad is connected to a plurality of sirens that are allows activated and deactivated as a group, the plurality of sires can be identified by a single identifier.

After addressing the message, the control panel 12 transmits the message to the first interim device identified in the address over a first communication bus (at block 104). If the address includes multiple interim devices, each interim device transmits the message to the next interim device according to the address (at block 106). Finally, the last-listed interim device transmits the message to the point device (i.e., the intended recipient of the message) over a second communication device (at block 108). Upon receiving the message, the point device operates or takes an action as instructed in the message.

As described above, in some embodiments, the control panel 12 communicates with point devices to monitor and manage the point devices. However, in other embodiments, interim devices communicate with the point devices to monitor and manage the point devices. For example, rather than communicating directly with point devices, the control panel 12 can communicate with an interim device that is configured to monitor and manage the point devices and notify the control panel 12 of any issues with the point devices (e.g., alarms generated, etc.).

Therefore, embodiments of the invention provide complex partitioning solutions without extensive logical enhancements or computing power at the central control panel. In particular, rather than physically grouping points based on their physical location within the premises, embodiments of the invention simplify partitioning and address based on inherent connections between points.

Various features and aspects of the invention are set forth in the following claims.

What is claimed is:

1. A security system comprising:
   a plurality of point devices positioned in a premises;
   a plurality of interim devices, each of the plurality of interim devices associated with one particular area of the premises;
   a control panel;
   a first communication bus connecting the control panel and each of the plurality of interim devices; and
   a plurality of second communication buses, each of the plurality of second communication buses connecting one of the plurality of interim devices with at least one of the plurality of point devices,
   each of the plurality of point devices having an address including an identifier of at least one of the plurality of interim devices,
   the control panel configured to
      access the address of each of the plurality of point devices,
      perform an automatic assignment that automatically assigns each of the plurality of point devices to one particular area of the premises based on the identifier of at least one of the plurality of interim devices included in the address of the point device,
      generate a message for one particular area of the premises,
      identify one of the plurality of point devices assigned to the one particular area based on the automatic assignment,
      address the message to the identified one of the plurality of point devices,
      transmit the message to the identified one of the plurality of point devices, and
      receive a manual adjustment to the automatic assignment for at least one of the plurality of point devices, the manual adjustment re-assigning at least one of the plurality of point devices to a different particular area of the premises than the one particular area of the premises assigned during the automatic assignment.

2. The security system of claim 1, wherein the plurality of point devices includes at least one input device receiving input from the environment of the premises.

3. The security system of claim 2, wherein the at least one input device includes at least one selected from the group comprising of a motion detector, a panic button, a smoke detector, a water sensor, a flow switch, and an image sensor.

4. The security system of claim 1, wherein the plurality of point devices includes at least one output device providing output to the environment of the premises.

5. The security system of claim 4, wherein the at least one output devices includes at least one selected from the group comprising of a relay, a siren, a door strike, and a strobe.

6. The security system of claim 1, wherein the plurality of interim devices includes a plurality of interface devices configured to interface with a user located on the premises.

7. The security system of claim 6, wherein the plurality of interface devices includes at least one selected from the group comprising of an access reader, a keypad, and a keyswitch.

8. The security system of claim 1, wherein each of the plurality of second communication buses connects one of the plurality of interim devices with each of the plurality of point devices located closest to the one of the plurality interim devices than the remaining plurality of interim devices.

9. The security system of claim 1, wherein the message is addressed based on a plurality of interim devices, wherein each interim device is connected downstream of the control panel and upstream of the point device.

10. The security system of claim 1, wherein the control panel is not directly connected to the plurality of second communication buses.

11. A method of communicating with a point device connected to a control panel included in a security system, the method comprising:
    accessing an address of each of a plurality of point devices, the address of each of the plurality of point devices including an identifier of at least one of a plurality of interim devices, wherein each of the plurality of interim devices is associated with one particular area of a premises being monitored by the security system;
    performing an automatic assignment that automatically assigns each of the plurality of point devices to one particular area of the premises based on the address of the point device;
    generating, at the control panel, a message associated with one particular area of the premises;
    identifying, at the control panel, one of the plurality of point devices assigned to the one particular area based on the automatic assignment;
    addressing, at the control panel, the message to the identified one of the plurality of point devices;
    transmitting, at the control panel, the message to the interim device identified in the address of the one of the plurality of point devices over a first communication bus;
    transmitting the message from the interim device to the point device over a second communication bus, wherein the control panel is not directly connected to the second communication bus; and
    receiving a manual adjustment to the automatic assignment for at least one of the plurality of point devices, the manual adjustment re-assigning at least one of the plurality of point devices to a different particular area of the premises than the one particular area of the premises assigned during the automatic assignment.

12. The method of claim 11, wherein transmitting the message to the first interim device includes transmitting the message from the control panel to a second interim device and transmitting the message from the second interim device to the first interim device over the first communication bus.

13. A security system comprising:

a control panel;

a first communication bus connecting a control panel and each of the plurality of interim devices positioned in a premises being monitored by the security system, each of the plurality of interim devices associated with one particular area of the premises; and a plurality of second communication buses, each of the plurality of second communication buses connecting one of the plurality of interim devices with at least one of a plurality of point devices located closest to the one of the plurality of interim devices within the premises, each of the plurality of point devices having an address including an identifier of one of the plurality of point devices and an identifier of at least one of the plurality of interim devices, the control panel configured to access the address of each of the plurality of point devices, perform an automatic assignment that automatically assigns each of the plurality of point devices to one particular area of the premises based on the interim device identified in the address of the point device, generate a message associated with one particular area of the premises, identify one of the plurality of point devices assigned to the one particular area based on the automatic assignment, address the message to the identified one of the plurality of point devices where the address includes both an identifier associated with each point device and an identifier associated with the interim devices connected to the point device over one of the plurality of second communication buses, transmit the message to the identified one of the plurality of point devices, and receive a manual adjustment to the automatic assignment for at least one of the plurality of point devices, the manual adjustment re-assigning at least one of the plurality of point devices to a different particular area of the premises than the one particular area of the premises assigned during the automatic assignment.

14. The security system of claim 13, wherein the message is addressed based on a plurality of interim devices, wherein each interim device is connected downstream of the control panel and upstream of the point device.

15. The security system of claim 13, wherein the control panel is not directly connected to the plurality of second communication buses.

* * * * *